US009657708B2

(12) United States Patent
Bogorodsky

(10) Patent No.: US 9,657,708 B2
(45) Date of Patent: May 23, 2017

(54) PUMPED-STORAGE SYSTEM

(71) Applicant: Andrey Gennadievich Bogorodsky, Moscow (RU)

(72) Inventor: Andrey Gennadievich Bogorodsky, Moscow (RU)

( * ) Notice: Subject to any disclaimer, the term of this patent is extended or adjusted under 35 U.S.C. 154(b) by 0 days.

(21) Appl. No.: 15/223,832

(22) Filed: Jul. 29, 2016

(65) Prior Publication Data
US 2016/0333844 A1 Nov. 17, 2016

Related U.S. Application Data

(63) Continuation-in-part of application No. PCT/RU2014/000648, filed on Aug. 29, 2014.

(51) Int. Cl.
F03B 13/18 (2006.01)
F03B 3/04 (2006.01)
(Continued)

(52) U.S. Cl.
CPC ............. *F03B 3/04* (2013.01); *C02F 1/58* (2013.01); *F03B 3/18* (2013.01); *F03B 11/002* (2013.01); *F03B 13/06* (2013.01); *F03B 13/08* (2013.01); *C02F 2103/08* (2013.01); *F05B 2220/32* (2013.01); *F05B 2220/706* (2013.01); *F05B 2260/42* (2013.01); *F05B 2260/60* (2013.01); *Y02E 10/22* (2013.01); *Y02E 60/17* (2013.01)

(58) Field of Classification Search
CPC .. F03B 13/16; F03B 13/08; F03B 3/18; F03B 11/002; C02F 2103/08
USPC ................................ 60/497, 498; 290/50–54
See application file for complete search history.

(56) References Cited

U.S. PATENT DOCUMENTS 4,132,901 A * 1/1979 Crausbay .................. E02B 9/00
290/42
8,643,206 B2 * 2/2014 Ekern ..................... F03B 13/06
290/52
(Continued)

FOREIGN PATENT DOCUMENTS

GR 1006236 1/2009
RU 2353797 4/2009
SU 1393922 5/1988

OTHER PUBLICATIONS

Search report in PCT/RU2014/000648, dated May 17, 2015.

*Primary Examiner* — Thomas E Lazo
*Assistant Examiner* — Daniel Collins
(74) *Attorney, Agent, or Firm* — Bardmesser Law Group

(57) ABSTRACT

The invention relates to hydraulic systems with constant delivery of fluid under pressure, using continuous balancing of pressures generated by liquid accumulated in a reservoir and coming from a collecting system. The system converts motion of liquid to operate individual high-pressure pumps, which pump water through water pipes from a natural body of water into the reservoir above sea level. A device for pressure conversion of the flow of water coming through the water duct from the reservoir in the consumption energy for the production of useful work. Tanks are at the bottom of the reservoir and connected to high-pressure pumps that pump water at high pressure, and which are equipped with pressure accumulators to normalize the pressure. A buffer vessel at the bottom of water duct, below the reservoir and above the sea level, is equipped with pressure accumulators.

20 Claims, 2 Drawing Sheets

(51) Int. Cl.
    *C02F 1/58*     (2006.01)
    *F03B 3/18*     (2006.01)
    *F03B 11/00*     (2006.01)
    *F03B 13/08*     (2006.01)
    *F03B 13/06*     (2006.01)
    *C02F 103/08*     (2006.01)

(56) References Cited

U.S. PATENT DOCUMENTS

| | | | |
|---|---|---|---|
| 2010/0212310 A1* | 8/2010 | Welch, Jr. | F03B 13/1875 60/497 |
| 2014/0060028 A1* | 3/2014 | Schmidt-Bocking | F03B 13/06 60/398 |

* cited by examiner

PUMPED-STORAGE SYSTEM

BACKGROUND OF THE INVENTION

Field of the Invention

The present invention relates to hydraulic systems and power generation systems. In particular, the present invention relates to a conversion system, which converts the energy of various types to water pressure, followed by collection, normalization, accumulation, distribution, storage and utilization of this pressure, in order to perform useful work, such as, for example, electric power generation.

Description of the Related Art

To produce useful work on a commercial scale, it is necessary that generation volume is the same order of magnitude as what the consumer uses. Modern industry is based on national and transnational power grids, which have morning and evening peaks in populated areas, and constant or daytime load from industrial consumers. Today's technological equipment is calculated for the respective operating power sources, rated in the order of tens or hundreds of kilowatts and above.

Flow generators (wind and hydro-generators of various designs) can have a wide range of characteristics, including size, but with increase of their size, their inertia also increases. High inertia makes most of these structures operable only at a relatively strong flow of liquid or air, which is able to exceed their own inertia. This feature reduces the ratio of time in which the generator produces energy to the total working time.

A typical ocean wave has an amplitude range order of few meter or less, and the period on the order of several seconds. The main part of the wave energy is in the fluctuation of vertical surface. Generators that utilize the fluctuation of water surface theoretically cannot be effectively equipped with a working body (floats) with dimensions of more than half of the wave period due to dampening (skirt) the wave itself, losing the efficiency of its use.

For the above reasons, the most promising operating mechanisms for the industrial purposes are sufficiently lightweight mechanisms that allow capturing the energy impact of the least natural disturbances at the maximum level. As a result, these mechanisms will have a small useful output from single mechanism, therefore multiple units will create arrays for energy extraction from natural phenomena. In addition, various natural phenomena may occur in the same geographic location at different (including overlapping) time intervals, which makes it reasonable to use sufficiently versatile energy collection systems.

Currently, all known methods of electric power generation using the power of permanent or periodic motions of natural masses in marine areas are divided into two broad classes:

1. Systems of direct power generation on the system itself in the place of installation
2. Systems based on transporting volumes of water from the natural water bodies to the target engines.

Systems of the first type have two design disadvantages:

The presence of electrical equipment immediately adjacent to the working body in the area of the ocean that (taking into account the electrical conductivity of sea water) requires to equip them with a variety of safety systems, which leads to complexity of such systems and increases the cost of their construction and maintenance; and Instability of the power generation results in the need for the collection and distribution systems, which also complicates the construction of distributed systems of this type.

Systems of the second type operate installations of a single working mechanism, which makes it necessary to use a system of pipes and/or hoses for the delivery of pumped liquid to the place of its utilization. Bernoulli's Law introduces significant unproductive losses of energy in the pipes/hoses, which greatly reduces the effectiveness of such systems.

For example US2005034452 discloses a pumped-storage system that uses gravitational force of downward movement of large amounts of water for conversion into electrical energy. In a preferred embodiment, the system uses an artificial lake. Although at greater height difference, performance can be higher, it is sufficient if the lake is located at a height of between twenty to thirty feet. The lake, which may exceed one hundred acres in size, can be located above and adjacent to the natural water bodies (for example, it can be located on the coast line of the ocean). Sandy soil makes construction of the system easier. An underground generator is used for the conversion of energy and pumping of water back to the upper reservoir during low energy demand, and can significantly reduce the noise level. The system can be used to provide significant levels of power during peak power demands, when other power supplies are more expensive and require power to operate. The system components fit the landscape esthetically, which allows the use of the system in a residential area.

U.S. Pat. No. 4,132,901 describes a power generation system suitable for terrain located in an elevated position, where there is not sufficient water supply for power generation. The shortage of water is covered by the reservoir, which is located in an elevated position, and a system of pumps for pumping water into the tank. Devices that operate on the principle of wave motors for pumping of water up from the sea level are used as pumps.

JPH11247164, publ. 14 Sep. 1999, discloses an underground system of a pumped-storage power plant for desalination and the use of salt water. The system comprises a vertical shaft extending vertically downwards from the sea level, and a second vertical shaft extending from the upper reservoir. A pipe with the reverse osmosis membrane is installed in the middle. Fresh water is produced from seawater and is stored in an underground tank. Then the water is pumped during off-peak time and is stored in the upper reservoir. During peak demand, the energy is generated by discharging the water back into the underground reservoir.

For example, application RU2011122189, publ. 10 Dec. 2012 describes a pumped-storage wind power plant, which includes an upstream pond, a water intake, a penstock, at least one irreversible hydro generator pair consisting of a hydraulic turbine, a power generator and a coupling between them, and a suction tube to drain used water in the storage downstream reservoir for its transfer to the upstream pond and re-circulating it through water turbine. On the bank of the downstream accumulative reservoir or on a platform above the surface of the water at an optimal distance from the upstream reservoir dam to prevent interference with wind flow, there is at least one hydraulic pump with a wind turbine that is installed in order to convert the wind energy into potential energy of the water column by pumping it from the downstream accumulative pond into the upstream pond, so as to pass again through the turbine-generator pair.

WO2010060504, publ. 03.06.21010, describes a system and method for energy storage. The system includes at least one storage tank for seawater, which is located above the sea level in the vicinity of the seashore. At least one turbine is located in close proximity to the sea level—significantly below the level of the storage reservoirs. The turbine is connected to a power generator. At least one channel connects the reservoir and the turbine, in which a downward flow of sea water from the reservoir causes rotation of the turbine for power generation. The publication also describes methods for prevention of corrosion and accumulation of marine organisms in the system. The system may be fully or partially powered by intermittent renewable sources of energy such as wind.

RU2353797, publ. 27 Apr. 2009, describes a system of floating pumps (a field of pumps), which includes floating pumping units, assembled so as to feed fluid in the reservoir under the influence of the waves in the ocean. The reservoir is located on top of a cliff and takes the water pumped from the floating pumping units through the discharge line. Water can be accumulated in the reservoir and flow through the outlet flow line to the turbine (turbines) arranged in the engine room. Water can be discharged back into the ocean through a discharge line. In another embodiment, the reservoir may be located above the water space, i.e. on a ship or oil platform. By minimizing the amount of energy extracted from every wave, each float pump unit disposed in the pump field receives substantially the same amount of energy.

Regardless of the nature of used natural phenomena, all of them are not entirely predictable and generally do not coincide in time with the peaks of power networks' needs for energy. The current level of progress makes the storage of electricity expensive both financially and physically: mechanical accumulators of flywheels type spend part of the energy for the friction, the chemical elements involve environmental damage due to mining and production of their components, and batteries have non-zero self-discharge currents. The most effective way to store energy for future use for a long time is the use of physical laws: change and storage of the working fluid under pressure (pneumatic pressure accumulators used in transport), and the use of the gravitational force (pumped—storage power plants—PSPP).

PSPP in the classic version has a reservoir, in which it accumulates water for its work at a time when electricity is the least in demand, and produces electricity when it is needed for electricity grid. The downside of classic PSPP is that they consume electricity from the power grid to supplement the supply of water in the reservoir.

SUMMARY OF THE INVENTION

The invention relates to a pumped storage system that substantially overcomes one or more disadvantages of the related art.

The present invention is directed to improving the operational reliability of a pumped storage system by introducing a buffer vessel and to improving energy efficiency by placing the buffer vessel in an area between a natural pond and a reservoir.

This technical result is achieved by the fact that the pumped storage system includes the operating mechanisms that convert the motion of different natural elements into the work of individual high-pressure pumps. These high-pressure pumps pump water by means of water ducts from a natural body of water into the reservoir, placed at a level above the level of the natural body of water location. The system also includes a device for pressure conversion of the flow of water coming through the water duct from the reservoir in the consumption energy for the production of useful work. The system also includes tanks placed at the bottom of the reservoir and connected to individual high-pressure pumps, which are adapted to pump water at high pressure into these tanks. The tanks are equipped with pressure accumulators to normalize the pressure therein. The buffer capacity at the bottom of water duct is disposed below the reservoir and above the level of the location of natural reservoir, and is equipped with pressure accumulators to protect the water duct and working mechanisms of pressure takeoffs from the hydraulic impact.

These features are interconnected with the formation of a stable combination of essential features sufficient to obtain the desired technical result.

The present invention is illustrated by specific examples of embodiment which, however, are not the only ones possible, but clearly demonstrate the possibility of achieving a desired technical result.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
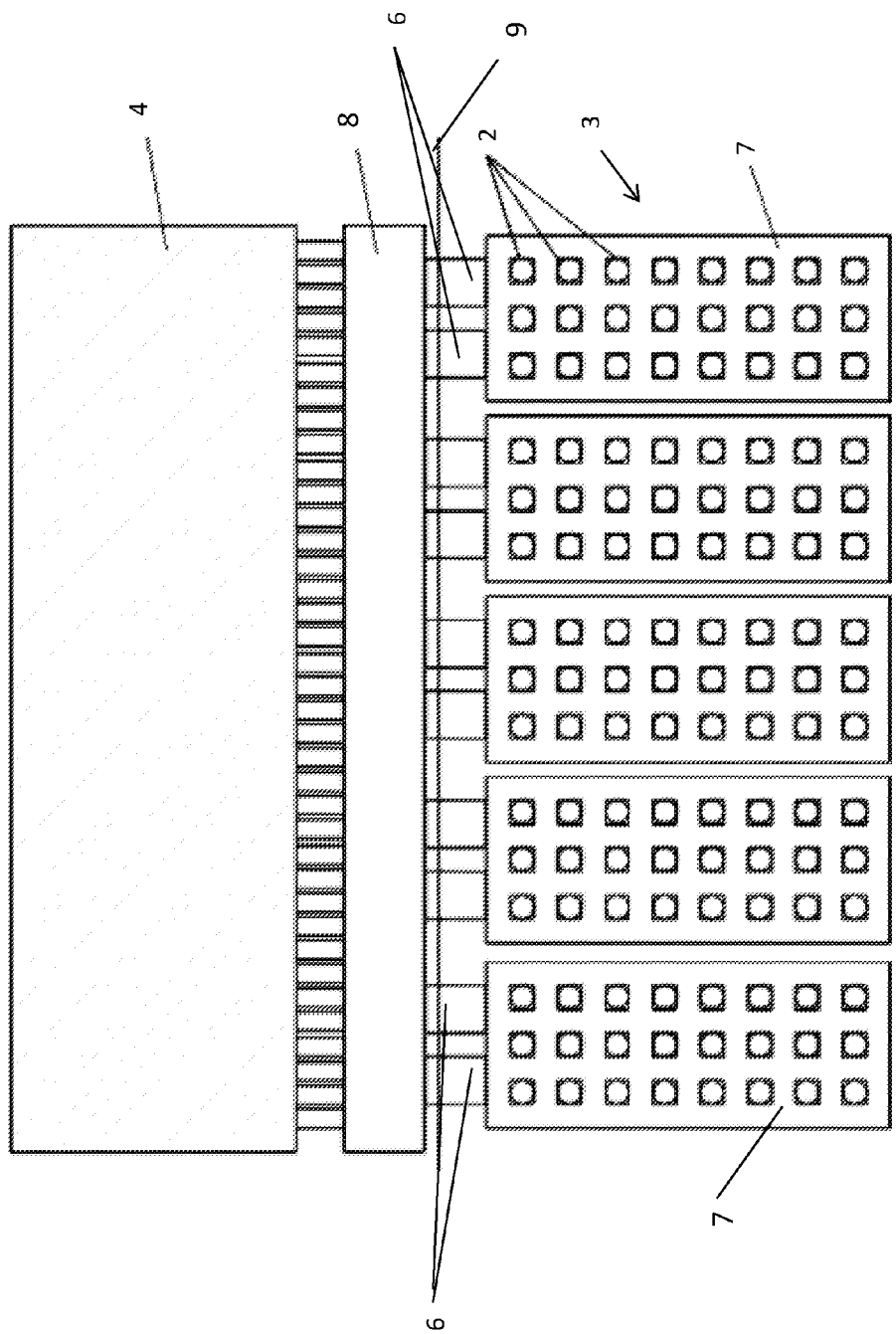
FIG. 1 shows an overall layout of the collecting tanks, water ducts, reservoirs and buffer vessel in a section perpendicular to the coastline.
Figure 2:
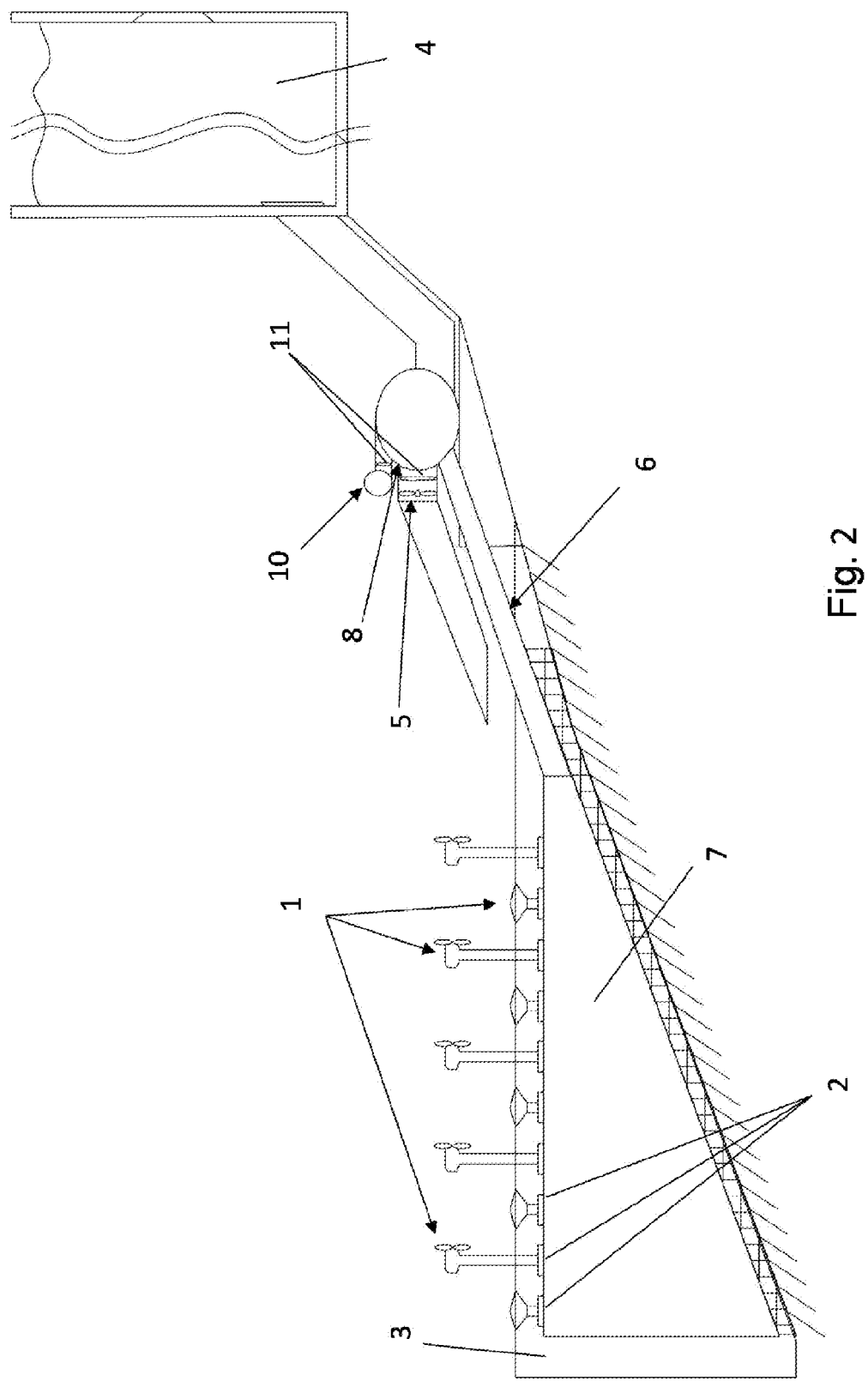
FIG. 2 shows placement of parts of the system on the surface of the shore and the bottom of the reservoir, in a plan view.

An embodiment of the present invention includes a system of tanks and ducts intended for the collection, normalization, accumulation, distribution, storage and utilization of fluids of different pressures, varying in different parts of the system in order to collect the energy of motion of different natural elements, and a subsequent production of a variety of useful work at the right time and in the right volumes, including production of electricity (see FIGS. 1 and 2).

Generally, presented as a block diagram in the figures, the pumped storage system includes the following operating mechanisms 1 (such as buoy driven pumps, windmill driven pumps, electric driven pumps), which convert energy of various types to operation of individual high-pressure pumps 2 (the pressure is determined by a height difference between the upper water storage reservoir and buffer vessel), which pump water by water ducts from the natural reservoir 3 (here, the length of incoming ducts is calculated via an area of the ocean surface that is equipped with buoy pumps (i.e., via a target energy that needs to be generated). Cross-section of ducts is calculated via a liquid friction and Bernoulli law. This can be formulated as "speed of linear water movement in any point of duct must not be more than 2 meter per second," but hydrodynamic calculations can give a more precise value), into the water reservoir 4, placed at a level above the natural reservoir location, as well as the device for pressure conversion 5 (such as turbine and electricity generator for electricity generation; water shutter for direct pressured water use; direct pressure converter (double turbine) with shutter for pressure targeting for water desalination; direct driven air compressor for air compression, etc.), of water flow coming through the water duct 6, from the reservoir in the consumption energy for the production of useful work. The system is provided with tanks 7 (the shape of the tanks is primarily defined by two criteria: 1) cross-section of shape (see above regarding roughly 2 meter per second for water moving) and 2) construction robustness for mechanism installation and ground retention, for reliable installation), placed at the bottom of the reservoir 3 and connected to individual high-pressure pumps 2, which are adapted to pump water at high pressure into these tanks and which are equipped with pressure accumulators to normalize the pressure therein, and in the buffer vessel 8 of the water duct 6, positioned below the reservoir and above the level of the location of natural reservoir and equipped with pressure accumulators to protect the water duct 6 and working mechanisms of pressure takeoff (spike) from the hydraulic impact. The buffer vessel 8 can be any shape which is larger than ducts' cross-section. The simplest shape is a round tube, but it can be a rectangle or any other suitable shape given the constraints of the construction location and used materials and technologies. Also it can be upgraded along a coastline in plant upgrade case, so it will preferably have an elongated shape along a coastline.

Location of the working pressure tapping point at the equilibrium point of pressures of the two systems allows producing the required amount of useful work regardless of the current direction of the dynamic balance of pressures between the two systems—the reservoir and the collecting system. The independence of the system performance from the instability of the natural activity over time is set in the design and construction of the system and theoretically allows providing set parameters for the production of useful work at any predetermined time. This feature allows using the system as a source of work for the production of electricity both for constant generation and for the power maneuver in national and trans-national power grids—simultaneously for both purposes without reducing the effectiveness of none of them, water desalination, air compression or any other useful work.

This system, designed for the collection, normalization, accumulation, distribution, storage and utilization of fluids of different pressures, varying in different parts of the system in order to collect the energy of motion of different nature and the subsequent production of a variety of useful work at the right time and in the right volumes, including power generation, includes:

an array of containers (tanks) 7 at the bottom of the reservoir, suitable for connect to the operating mechanisms 1, which convert the movements of different nature in the work of individual high-pressure pumps 2, which pump water under high pressure in this system of tanks, and equipped with pressure accumulators to normalize the pressure therein.

reservoirs 4, calculated and built for storage of the volume of water, determined on the basis of necessary working time of the entire system. The volume of the reservoir is defined as a module of integral consumption on the settlement period with the necessary reserve. In this case, the volume and location of the construction of this reservoir does not depend on the influx and presence of rivers necessary for conventional hydroelectric power plants.

water duct (conduit) 6 between the system tanks at the bottom of the reservoir and the reservoir calculated and built on the basis of the volume of production of compressed water and its maximum outlet pressure from the system of tanks at the bottom of the pond. In this case, the pressure of water from the reservoir is approximately equal to the specified pressure from the system of tanks at the bottom of the reservoir, which allows conducting the most efficient calculation of conduit construction.

In a reduced projection case containers (tanks) 7 can be combined with a buffer vessel 8 up to using a same or similar building parts.

The buffer vessel 8 in the bottom of the water duct 6 (the area between the coastline 9 and the reservoir 4) is equipped with a pressure accumulator, which provides protection of water duct 6 and working mechanisms of pressure takeoff from the hydraulic impact, which provides a high rate of change of the pressure takeoff of the system, which in its turn increases the usefulness of all the proposed design for the production of useful work at any needed scope, including but not limited by electricity for the national and transnational power grids and (or) ocean water desalination. The buffer capacity, which stabilizes the pressure in the system, also allows to tap the pressure in order to produce other useful work with direct use 10 of water under pressure, without intermediate conversion into electricity, thus increasing the overall efficiency of such operations (for example, a direct pressure supply at the pump/pumps or water turbine; the channels for the direct output of water from the buffer vessel 8 may be reduced by means of flaps 11).

The presence of water in almost infinite volumes around the system allows to capture it by operating mechanisms, to pressurize it up to the operating pressure and transmit it to the part of the system intended for its collection from the working mechanisms. The working mechanisms thus can use movements of any natural masses for their work. These can be different water movements (currents, fluctuations of tides, churning of water at the surface), air movement (wind) or other natural phenomena that can be transformed by the operating mechanism in the work of its pump. In a particular case, the operating mechanism may be provided with an electric pump, if there is a need to utilize electricity from unstable sources, such as solar panels.

Specially designed system of tanks at the bottom of the reservoir collects various portions of water under different pressure rates (but not lower than the internal pressure of the tank), damping the pressure surges by means of pressure accumulators, which smoothes out pressure surges in the tank up to the average quickly enough, so they do not interfere with the operation of the working mechanisms. Subsequently, the pressure between the volumes is aligned according to the law of communicating vessels. This design allows the proposed system not to use pressure limiters, separate from the operating mechanisms, and thus save energy, communicated into the system by means of a portion of excessively high pressure fluid, and accumulate it for useful work.

The artificial reservoir, built on the beach, is a reservoir for the temporary storage of water for the same purpose as in the classic PSPP. The difference in height between the water level in the reservoir tank and the system of tanks at the bottom determines the operating pressure in the system of tanks and is set at the design stage of the entire system. This difference is not constant and varies during the operating cycle of the system. The larger the reservoir area, less the change in pressure in the system of tanks at the bottom of the reservoir during the work cycle.

The operating cycle of the simplest system of the proposed construction is 24 hours, which allows serving successfully the so-called daily fluctuations of electricity consumption. A more attractive option is a system that is calculated in view of fluctuations in electricity consumption within a week (weekends recession), which significantly increases the demand for such a system from the side of power supply systems with a slight increase in reservoir size (about dozens of percent). A further increase in buffering capacity of the system by increasing the capacity of the reservoir to buffer (for example, seasonal fluctuations in energy consumption) is structurally possible, but economically inefficient.

Between the reservoir and the system of tanks for pressure collection, there is located a water duct with an intermediate capacity for pressure takeoff. The main water duct is a system of pipes of the maximum possible cross-section, whose material and cross-section is selected at the design stage, taking into account the existing structural materials and construction technologies. Usually, steel or reinforced concrete pipes about 5-7-9 meters in diameter (often with smoothing steel or plastic inserts) are used for huge plants and HDPE/LDPE pipes for smaller ones. Since the manufacturing and fixing of larger diameter tubing is much more expensive, the water duct is typically made of the necessary number of available tubes. The larger the diameter of the water duct pipes (straight pipes), the lower non-productive energy wasted due to water friction and the greater the overall efficiency of the entire system.

An intermediate tank for pressure takeoff for the production of useful work is placed in a convenient location (usually it is a land surface on the shore). A tank for pressure takeoff is needed for two reasons:

In order to avoid hydraulic impact in case of change of direction of water movement to/from the reservoir, it is necessary to have a buffer tank with damping mechanisms for the protection against hydraulic impact;

An effective rapid change of the amount of fluid taken from the system allows to raise the demand for the system in order to generate electricity and for other purposes (but this also can cause a hydraulic pressure spike).

The use of a separate tank for pressure takeoff, equipped with pneumatic or other pressure accumulators:

allows to conveniently divide water duct pipes of different diameters and mechanisms for the production of useful work, which thus can have independent dimensions;

provides a relatively large capacity (several times larger in volume than the pipeline of the water duct on this interval), equipped with pneumatic or other pressure accumulators, which effectively smooth out pressure fluctuations in the system. The required capacity of the pressure accumulators is calculated at the stage of system design based on the proposed rate of the pressure takeoff change in the system and can reach tens of operation seconds in cubic meters of working fluid. Because the pressure accumulators in this case are located in a stationary building and are easily accessible for inspection and maintenance, they can be set in the desired quantity in terms of production and mounting of structure.

Besides the selection of pressurized fluid for energy production the system also allows to effectively select the required amount of fluid under pressure for direct use without conversion into electricity, for example:

A drive unit of the pneumatic pump for the production of compressed air for the needs of the plant itself, for accumulation in high-pressure containers and subsequent use, such as in a pneumatic tool;

Direct use of water under pressure for the washing of transport, vessels

Water pressure direct conversion for ocean water desalination;

Driving other working mechanisms for any purpose.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A pumped storage system comprising:
operating mechanisms that convert movement of water or air into work of individual high-pressure pumps,
wherein the pumps pump water through water ducts from a natural body of water into a reservoir,
wherein the reservoir is placed above a water level of the natural body of water;
a device for conversion of a flow of water through the water ducts from the reservoir into useful work;
the system further includes volumes, located at a bottom of the natural body of water and connected to the high-pressure pumps,
wherein the high-pressure pumps are configured to pump water at high pressure into the volumes;
a pressure accumulator for normalization of pressure in the volumes; and
a buffer volume located at a coastline and located below the reservoir and above the water level in the natural body of water,
wherein the buffer volume includes pressure accumulators to protect the water ducts from a pressure spike due to hydraulic impact.

2. The system of claim 1, wherein the operating mechanisms include buoy driven pumps.

3. The system of claim 1, wherein the operating mechanisms include windmill driven pumps.

4. The system of claim 1, wherein the operating mechanisms include electric driven pumps.

5. The system of claim 1, wherein pressure of the high-pressure pumps is determined by a height difference between the reservoir and the buffer vessel.

6. The system of claim 1, wherein a length of the water ducts is calculated via an area of the ocean surface that is equipped with buoy pumps.

7. The system of claim 1, wherein a length of the water ducts is based on a target energy that needs to be generated.

8. The system of claim 1, wherein a length of the water ducts is such that a speed of linear water movement in any point of any of the water ducts is no more than 2 meters per second.

9. The system of claim 1, wherein the device for pressure conversion is a turbine and electricity generator.

10. The system of claim 1, wherein the device for pressure conversion is a water shutter for direct pressured water use.

11. The system of claim 1, wherein the device for pressure conversion is a direct pressure converter (double turbine) with shutter for pressure targeting for water desalination.

12. The system of claim 1, wherein the device for pressure conversion is a direct driven air compressor.

13. The system of claim 1, wherein the buffer vessel has a shape that is larger than a cross-section of the water ducts.

14. A pumped storage system comprising:
   operating mechanisms that use water movement for operation of high-pressure pumps;
   a plurality of water ducts for pumping water from a natural body of water into a reservoir located above a water level of the natural body of water, using the high-pressure pumps;
   a device for conversion of water flow through the water ducts into useful work,
   a plurality of volumes at a bottom of the natural body of water and connected to the high-pressure pumps,
   wherein the high-pressure pumps are configured to pump water at high pressure into the volumes;
   a pressure accumulator for normalizing pressure in the volumes; and
   a buffer volume located at a coastline and located below the reservoir and above the water level in the natural body of water,
   wherein the buffer volume includes pressure accumulators to protect the water ducts from a pressure spike.

15. The system of claim 14, wherein the operating mechanisms include any of buoy driven pumps, windmill driven pumps, and electric driven pumps.

16. The system of claim 14, wherein pressure of the high-pressure pumps is determined by a height difference between the reservoir and the buffer vessel.

17. The system of claim 14, wherein a length of the water ducts is calculated via an area of the ocean surface that is equipped with buoy pumps.

18. The system of claim 14, wherein a length of the water ducts is based on a target energy that needs to be generated.

19. The system of claim 14, wherein a length of the water ducts is such that a speed of linear water movement in any point of any of the water ducts is no more than 2 meters per second.

20. The system of claim 14, wherein the device for pressure conversion is any of a turbine and electricity generator, a water shutter for direct pressured water use, a direct pressure converter (double turbine) with shutter for pressure targeting for water desalination, and a direct driven air compressor.

* * * * *